United States Patent
Schnatterer et al.

(10) Patent No.: US 6,496,092 B1
(45) Date of Patent: Dec. 17, 2002

(54) ELECTROMAGNETIC DRIVE

(75) Inventors: Jürgen Schnatterer, Wolfschlugen (DE); Martin Maichl, Salach (DE); Bernd Kärcher, Neckartenzlingen (DE); Jürgen Gerhartz, Esslingen (DE)

(73) Assignee: Festo AG & Co., Esslingen (DE)

( * ) Notice: Subject to any disclaimer, the term of this patent is extended or adjusted under 35 U.S.C. 154(b) by 56 days.

(21) Appl. No.: 09/674,976

(22) PCT Filed: Mar. 18, 2000

(86) PCT No.: PCT/EP00/02430

§ 371 (c)(1),
(2), (4) Date: Nov. 8, 2000

(87) PCT Pub. No.: WO00/60261

PCT Pub. Date: Oct. 12, 2000

(30) Foreign Application Priority Data

Mar. 31, 1999 (DE) .......................................... 299 05 883

(51) Int. Cl.[7] .............................. H01F 7/08; H01F 5/00
(52) U.S. Cl. ..................... 335/220; 335/229; 335/266; 335/281; 251/129.09; 251/129.16
(58) Field of Search .................... 335/229–234, 335/243–252, 266, 281; 251/129.16, 129.09

(56) References Cited

U.S. PATENT DOCUMENTS

| | | | | |
|---|---|---|---|---|
| 4,604,599 A | | 8/1986 | Koehler | 335/230 |
| 5,359,309 A | * | 10/1994 | Juds et al. | 335/256 |
| 5,546,063 A | * | 8/1996 | Hoffman | 335/229 |

FOREIGN PATENT DOCUMENTS

| | | |
|---|---|---|
| DE | 24 58 516 A1 | 6/1976 |
| DE | 44 17 142 A1 | 11/1995 |
| GB | 2 077 045 A | 12/1981 |

* cited by examiner

Primary Examiner—Ramon M. Barrera
(74) Attorney, Agent, or Firm—Hoffman & Baron, LLP

(57) ABSTRACT

An electromagnetic drive device is proposed comprising an electromagnet (21) having a magnetizable core (22) with a plurality of limbs (23 and 24) and an energizable winding arrangement (35) surrounding at least one limb (23 and 24) of the core (22). Furthermore there is a magnetizable magnet armature (15) able to be moved in relation to the core ((22) by varying the winding arrangement current. The (22) core has at least one U arrangement and is formed essentially by a plurality of sheet metal elements (30) resting against each other and extending athwart the direction of the parallel limbs (23 and 24), the parallel limbs being respectively surrounded by one winding (33 and 34) of the winding arrangement (35).

21 Claims, 1 Drawing Sheet

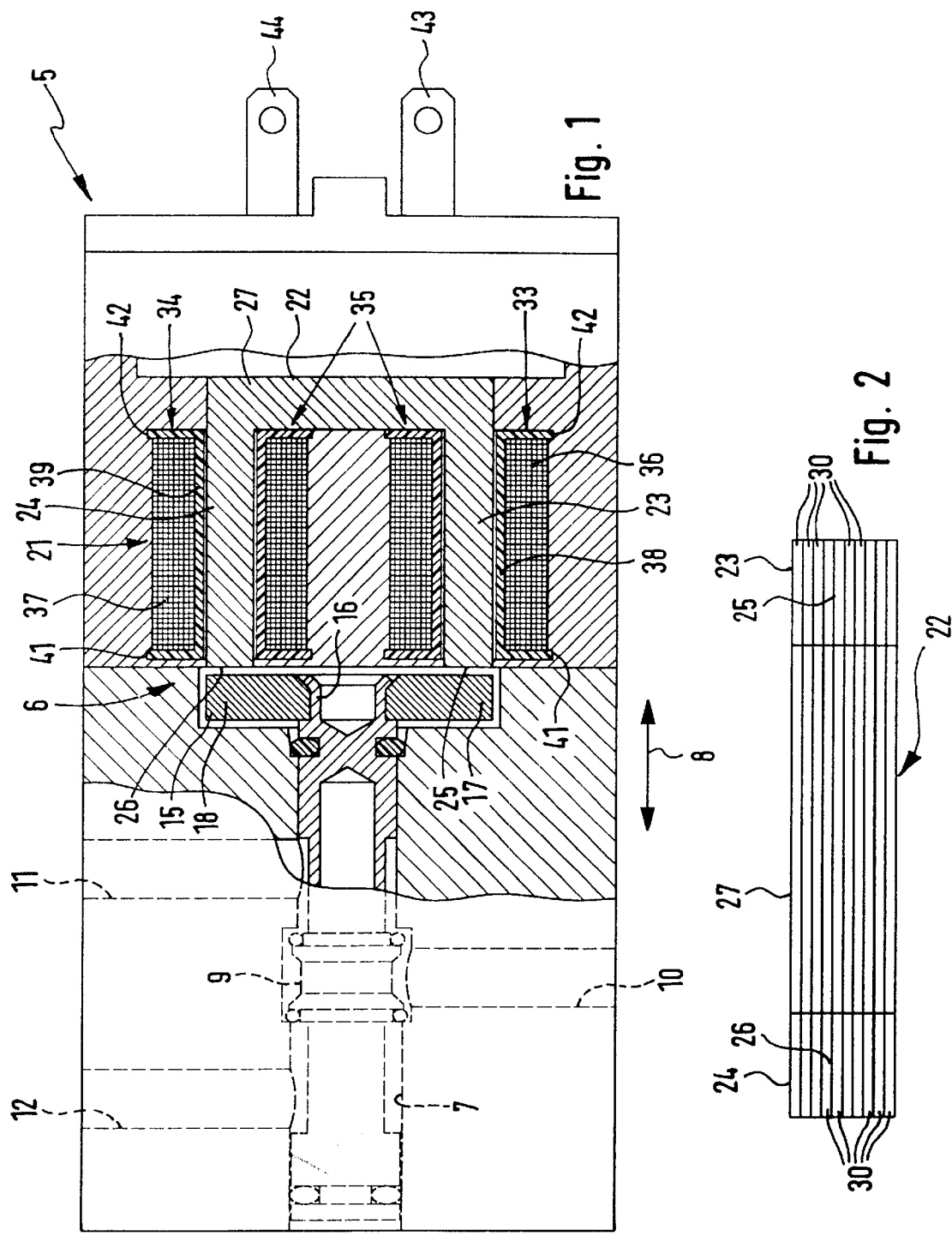

ELECTROMAGNETIC DRIVE

FIELD OF THE INVENTION

The invention relates to an electromagnetic drive device, more especially for a valve, comprising an electromagnet having a magnetizable core with a plurality of limbs and an energizable winding arrangement surrounding at least one limb of the core, said device further comprising a magnetizable magnet armature able to be moved in relation to the core by varying the winding arrangement current.

BACKGROUND OF THE INVENTION

Such an electromagnetic drive device is for example disclosed in the British patent publication 2,289,572 A, the core and the magnet armature constituting a so-called EI arrangement and the winding arrangement being constituted by a winding surrounding the middle limb of the E shaped core.

OBJECTS AND SUMMARY OF THE INVENTION

Starting with such a device one object of the invention is to provide an electromagnetic drive device, which renders possible more rapid switching while having a simple structure.

In accordance with the invention this object is to be fulfilled by the core having at least one U arrangement and preferably being formed as a U core or even as an E core and essentially by a plurality of sheet metal elements resting against each other and extending athwart the direction of the parallel limbs, the parallel limbs being respectively surrounded by one winding of the winding arrangement.

Owing to this particular arrangement high energy densities are produced in the magnetic field of the electromagnet. Owing to such high energy density there is the possibility of achieving rapid switching movements of the magnet armature, that is to say short switching times. Owing to low losses the drive device of the invention achieves a high efficiency.

Advantageous further developments of the invention will appear from the dependent claims.

Since the windings of the winding arrangement can be connected in series or in parallel to one another, it is possible for the overall resistance of the winding arrangement to be varied.

It is an advantage for the sheet metal elements constituting the core to possess a U or an E configuration. This renders possible simple manufacture of the core by superjacent stacking of the individual sheet metal elements.

It is furthermore convenient for the cross section of the core and/or of the magnet armature to have a polygonal and more particularly rectangular outline. For manufacture of a laminated core identical sheet metal elements are employed so that the core may be produced at a low cost.

As an alternative to this the cross section of the core and/or of the magnet armature may be oval or circular. More particularly, a circular cross section of the core may allow an adaptation of the form to the frequently circularly cylindrically wound windings.

It is also an advantage for the core and/or the magnet armature to consist of low retentivity magnetic material. Owing to this feature an low coercive field strength is ensured.

In the case of such low retentivity magnetic material it may be a question of ferrimagnetic or, respectively, ferromagnetic material. A ferrimagnetic material has a high resistivity. As a ferrimagnetic material iron may for example come into question.

Moreover it is expedient for the windings respectively to possess a non-magnetizable winding carrier, on which the winding is mounted. It is in this manner that a gap filled with the winding carrier is produced between the windings and the respectively associated limb of the core.

In the case of this design the winding carrier may consist of plastic so that extremely economic manufacture is possible.

The electromagnetic drive device in accordance with the invention will now be described in detail with reference to the accompanying drawings.

BRIEF DESCRIPTION OF THE DRAWINGS

FIG. 1 shows a valve in a partly sectioned lateral elevation, said valve having an electromagnetic drive device.

FIG. 2 shows an embodiment of the invention as a laminated U core from the front to show the terminal faces of the two U limbs.

DETAILED DESCRIPTION OF THE PREFERRED EMBODIMENTS

FIG. 1 shows a 3/2 way valve 5, which possesses an electromagnetic drive device 6 as an example of the invention.

The valve has a valve spool 9 able to be reciprocated in a valve spool receiving space 7 in the longitudinal direction 8 between two positions of switching. Three externally accessible fluid ducts 10, 11 and 12 open into the valve spool receiving space 7, the two fluid ducts 10 and 12 or the fluid ducts 10 and 12 being connected fluidwise with each other in a manner dependent on the switching position of the valve spool 9.

For actuation of the valve spool 9 the valve possesses the electromagnetic drive device 6. By means of the drive device 6 the valve spool can be reciprocated between the two switching positions.

The drive device 6 includes a magnet armature 15 of magnetizable material, which is kinematically coupled with the valve spool 9 and in the working example is fixedly joined to same. As shown in FIG. 1 the magnet armature 15 is secured to the terminal region, associated with the interior of the valve 5, of the valve spool 9. The magnet armature 15 possesses a rectangular block-like form and so extends athwart the valve spool 9 that its two terminal section 17 and 18 extend away from the valve spool 9 on diametrally opposite sides of the valve spool 9. The two terminal regions 17 and 18 are essentially of equal length.

As a modification of the working embodiment illustrated the cross section of the magnet armature could also be altered in many different ways and it could for example be oval or circular or have a different polygonal cross formation.

The electromagnetic drive device 6 comprises furthermore an electromagnet 21, with whose aid a movement of the magnet armature 15 may be caused so that a switching over of the valve spool from one switching position into the other position can be brought about.

The electromagnet 21 possesses a U shaped core 22 of a magnetizable material. In the preferred working example it has a rectangular cross section. Its two mutually parallel U limbs 23 and 24 are associated respectively at their free end 25 and, respectively, 26 with the magnet armature 15. In the assembled state the two U limbs 23 and 24 extend essentially in the longitudinal direction 8. By means of a transverse limb 27 the two U limbs 23 and 24 are joined together at their ends opposite to the free ends 25 and 26.

As a modification of the illustrated working example of the drive device 6 the cross section of the core 22 could also be oval or circular or have some other different polygonal configuration.

In the example both the core 22 and also the magnet armature 25 are manufactured of low retentivity magnetic material. In this respect basically ferrimagnetic or, respectively, ferromagnetic material could be utilized, a ferromagnetic material, as for instance iron, being employed in the present case of application.

The U shaped core 22 is laminated in construction. It accordingly does not consist of solid material but is rather more made up of a plurality of sheet metal elements 30 extending athwart the direction of the two U shaped limbs 23 and 24, that is to say athwart the longitudinal direction 8. In the illustrated working embodiment the individual sheet metal elements or laminations 30 also possess a U-like configuration so that their outline is in lateral view the same as that of the core 22. Owing to the rectangular cross section of the core 22 here same may be built up by stacking a plurality of U-like sheet metal elements 30. One could also say therefore that the core 22 possesses a layered or laminated structure.

The sheet metal elements 30 are insulated from each other so that more particularly in the case of a high frequency of the switching on and off operations of the electromagnet 21 the eddy current losses may be kept extremely low. The insulation of the sheet metal elements 30 may for example be produced by the application of a thin, non-conducting lacquer layer or the like on the sheet metal elements 30.

Furthermore the electromagnet 21 possesses an energizable winding arrangement 35 constituted by two electrical windings 33 and 34. The winding arrangement 35 is so arranged that the two U limbs 23 and 24 are surrounded by a respective winding 33 and, respectively, 34. In this respect it is a question of two windings 33 and 34 in the form of cylindrical windings with, for example, a rectangular passage opening for receiving the U limbs 23 and 24 respectively, the axis of the cylinder coinciding with the direction of the respectively associated U limb 23 and, respectively, 24.

The two windings 33 and 34 respectively have a coil 36 and 37, which is mounted on a respectively associated tubular winding carrier 38 and, respectively, 39. The internal form of the winding carriers 38 and 39 is adapted to the cross section of the U limbs 23 and 24 so that the winding carriers 38 and 39 can be slipped onto the respectively associated U limb 23 and 24 from the free end 25 and, respectively, 26.

The winding carriers 38 and 39 consist non-magnetizable material, as for example plastic, and consequently there is a peripherally extending intermediate space between the windings 36 and 37 and the respectively associated U limbs 23 and, respectively, 24.

At their two axial end the winding carriers 38 and 39 respectively bear an annular flange 41 and 42 so that the winding carriers 38 and 39 delimit the respectively associated coil 36 ar, respectively, 37 from the two axial sides as well.

The two electrical windings 33 and 34 of the winding arrangement 35 of the electromagnets 21 may be connected up either in series or in parallel. The windings 33 and 34 are, in the fitted condition of the drive device 6 in the valve 5, electrically connected with two externally accessible electrical contacts 43 and 44, via which the windings 33 and 34 may be energized.

In the following the function of the electromagnetic drive device 6 will be explained.

In the illustrated working embodiment by means of a spring arrangement, for example, not illustrated in detail, the magnet armature 15 is biased into the switching position in which it is at a greater distance from the electromagnet 21 and, respectively, the two free ends 25 and 26 of the U limbs 23 and. This switching position is illustrated in FIG. 1.

If now starting from this switching position an external winding current is applied to the electrical contacts 43 and 44 and thence to the two windings 33 and 34, a magnetic field will be produced, which draws the magnet armature 15 toward the two U limbs 23 and 24 of the core 22. The magnet armature 15 will move until it finds a stable terminal position, which here defines the further switching position. This switching position, wherein the magnet armature 15 is nearer to the core 22, is maintained as long as DC flows through the two windings 33 and 34.

After switching off the winding current the magnetic field produced by the two windings 33 and 34 will collapse and the magnet armature 15 will be pulled from the core 22 by the biasing means back into the other position of switching.

The electromagnetic drive device 6 is in a position to perform the above described switching operations extremely rapidly so that high switching frequencies may be achieved.

As a modification of the above described working example it would be feasible as well for the magnet armature 15 to be in the form of a permanent magnet so that the switching motion of the magnet armature 15 could take place in both directions and be performed by the electromagnet 21. For this purpose the direction of the current of the winding current would be suitably selected so that in the one case the magnet armature 15 by the electromagnet 21 and in the other case on reversing the current there is repulsion of the magnet armature 15 by the electromagnet 21. It is in this manner that it is possible for the magnet armature 15 and the valve spool 9 connected therewith to be shifted into the two switching positions. When not energized the magnet armature 15 will remain in the attracted position at all times. A bistable design is also possible.

It remains to be pointed out that the electromagnetic drive device 6 can be employed for other purposes besides driving a valve 5, in which an outer drive part is to be reciprocated between the two positions the magnet armature 15.

As a modification of the working example as described and illustrated it is possible for the core 22 to possesses a plurality of adjacently arranged U arrangements instead of a single U arrangement (U core). In the case of second adjacently placed U arrangements there would then be one E core, the middle limb constituting a common limb for both U arrangements. In the case of three or more limbs each limb would be provided with a winding.

What is claimed is:

1. A valve having an electromagnetic drive comprising:
   a valve spool adapted to be longitudinally reciprocated in a valve spool receiving space;
   a magnetizable magnet armature fixed to an end of said valve spool;
   a magnetizable core having at least two substantially parallel limbs defining a U-shape, the free ends of said limbs facing said magnet armature and said core comprising a plurality of sheet metal elements stacked together in a direction perpendicular to the direction of said limbs; and a winding for carrying electrical current respectively surrounding each of said parallel limbs, wherein said magnet armature is movable with respect to said core by varying the electrical current in said windings.

2. A valve as defined in claim 1, wherein said core has three parallel limbs defining two U-shapes.

3. A valve as defined in claim 1, wherein said windings surrounding said parallel limbs are connected in series with one another.

4. A valve as defined in claim 1, wherein said windings surrounding said parallel limbs are connected in parallel with one another.

5. A valve as defined in claim 1, wherein each of said sheet metal elements is U-shaped.

6. A valve as defined in claim 1, wherein each of said sheet metal elements is E-shaped.

7. A valve as defined in claim 1, wherein the cross-section of said core is polygonal.

8. A valve as defined in claim 7, wherein the cross-section of said core is rectangular.

9. A valve as defined in claim 1, wherein the cross-section of said magnet armature is polygonal.

10. A valve as defined in claim 9, wherein the cross-section of said magnet armature is rectangular.

11. A valve as defined in claim 1, wherein the cross-section of said core is oval.

12. A valve as defined in claim 1, wherein the cross-section of said core is circular.

13. A valve as defined in claim 1, wherein the cross-section of said magnet armature is oval.

14. A valve as defined in claim 1, wherein the cross-section of said magnet armature is circular.

15. A valve as defined in claim 1, wherein said core comprises a low retentivity magnetic material.

16. A valve as defined in claim 15, wherein said low retentivity magnetic material is a ferromagnetic material.

17. A valve as defined in claim 1, wherein said magnetic armature comprises a low retentivity magnetic material.

18. A valve as defined in claim 17, wherein said low retentivity magnetic material is a ferromagnetic material.

19. A valve as defined in claim 1, further comprising a non-magnetic coil carrier, said windings being mounted in a coil on said coil carrier.

20. A valve as defined in claim 19, wherein said coil carrier comprises a plastic material.

21. A valve as defined in claim 1, wherein said magnet armature comprises a permanent magnet.

* * * * *